METHOD OF PRODUCING A PHOTOCELL ASSEMBLY

Filed Feb. 5, 1959 2 Sheets-Sheet 1

Inventors:
William B. Hugle
Frances B. Hugle
By: Graf, Nissman & Burmeister
Attorneys METHOD OF PRODUCING A PHOTOCELL ASSEMBLY
Filed Feb. 5, 1959 2 Sheets-Sheet 2
FIG. 7
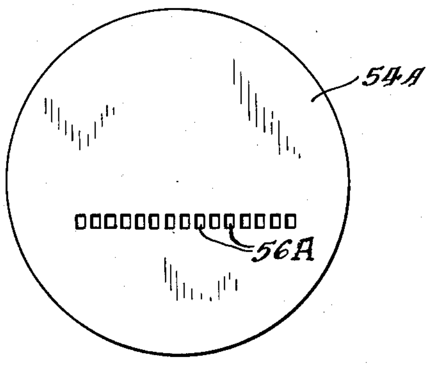
FIG. 8 FIG. 9
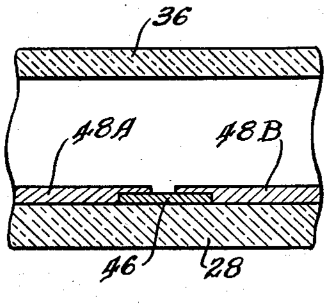
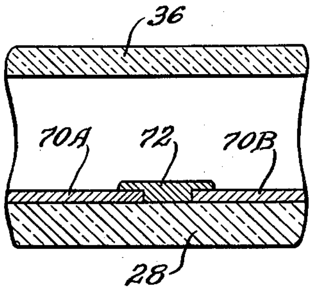
Inventors:
William B. Hugle
Frances B. Hugle
By: Graf, Nerman & Burmeister
Attorneys United States Patent Office 3,187,414

Patented June 8, 1965

3,187,414

METHOD OF PRODUCING A PHOTOCELL ASSEMBLY

William B. Hugle and Frances B. Hugle, Union Township, Clermont County, Ohio, assignors to D. H. Baldwin Company, Cincinnati, Ohio, a corporation of Ohio Filed Feb. 5, 1959, Ser. No. 791,400

8 Claims. (Cl. 29—155.62)

The present invention relates to photocells and methods of manufacturing photocells. This application is a continuation-in-part of application Serial No. 574,804, entitled "Semi-Conductive Films and Methods of Producing Them," filed March 29, 1956, now Patent No. 2,994,621.

In recent years, optical encoders have been developed which employ an assembly of photocells in combination with a light source and a code disc disposed between the light source and photocell assembly to produce a binary output representing the angle of the code disc from a reference axis. Application Serial No. 631,818 of William Pong entitled "Encoder," filed December 31, 1956, now Patent No. 3,076,959, is an example of such an encoder. As pointed out in the Pong application, the sensitive areas of each of the photocells are desirably extremely small in order to avoid the use of a read-out slit between the code disc and the photocell assembly. Although the present invention will be illustrated as applied to an optical encoder, it is to be understood that photocell assemblies have many utilities in addition to optical encoders, such as devices for reading out information on punched cards.

The present inventors have disclosed in their application referred to above the method of making the semi-conductive film by the steps of depositing on the electrically insulating base films of anion material and cation material, and thereafter heating the superimposed films to produce a reaction between the anion and cation materials. It is an object of the present invention to provide a photocell and an assembly of photocells employing films of the type disclosed in this application.

It is a further object of the present invention to provide a photocell and an assembly of photocells employing a substrate of electrically insulating material which carries at least one pair of spaced confronting electrodes and a mass of semiconductive material disposed on the substrate and overlapping the electrodes. Photocells of this type have exhibited very desirable electrical characteristics and make it possible to use any of the well known circuit printing techniques for placing the electrode pair on the substrate, however, it has not always been possible to reproduce photocells which exhibit the same electrical characteristics. Further, the effective gap or slit width, that is the effective distance between the confronting electrodes, has proven to be greater in some constructions than the actual distance between the electrodes, and the effective slit varies from photocell to photocell.

It is believed that one of the causes of both the deviation between the effective slit width and the actual slit width and the poor reproducibility of photocells is corrosion between the electrodes and the photoconductive layer. During the process of forming the photoconductive layer upon the electrodes from alternate films of anion and cation material, relatively high temperatures are employed, and it is believed that corrosion products develop between the semiconductive layer and the electrodes during this step of the manufacturing process which introduce substantial resistance between the photoconductive strip and the electrodes.

It is also believed that the effective gap width of photocells of this type is in part influenced by the thickness of the photoconductive coating. This difficulty can be solved by optical masking, that is providing an optical slit confronting the mass of photoconductive material. It is a further object of the present invention to provide a photocell using a photoconductive film on a substrate and electrodes disposed on the film to form an optical mask as well as electrical connections.

Further, the photocells which have previously been known and used have been relatively difficult to assemble and relatively expensive. This has partly been due to the difficulty of connecting each of the electrodes to a terminal. Photocell assemblies for use in encoders must be constructed with very small spacings between adjacent photocells, hence necessitating a relatively large number of terminals for the photocell in a very restricted area. Further, it is desirable to employ printed circuit techniques for encoders due to the limited space, and hence the photocell terminals are preferably adapted to plug into a printed circuit board. It is, therefore, among the objects of the present invention to provide a photocell and an assembly of photocells which may be more readily manufactured and at lower cost.

These and additional objects of the present invention will be more readily appreciated from a consideration of the remainder of the disclosure, particularly when viewed in the light of the drawings, in which.

Figure 1:
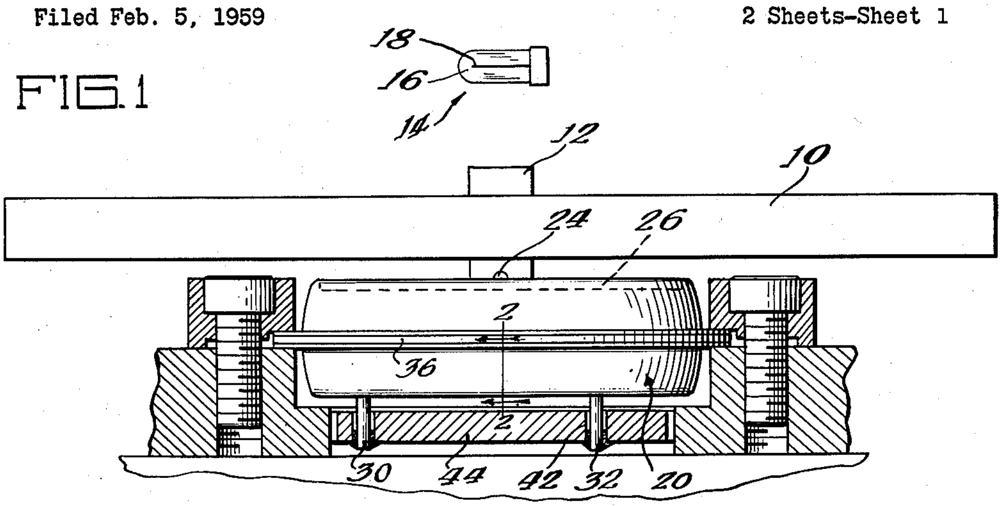
FIGURE 1 is a sectional view of a portion of an optical encoder employing a photocell assembly constructed according to the teachings of the present invention.
Figures 2, 3, 5:
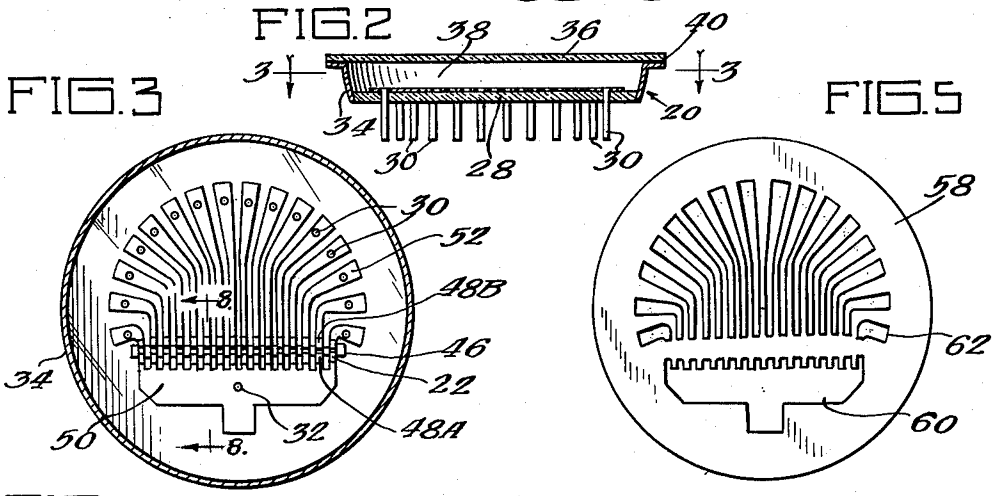
FIGURE 2 is a sectional view of the photocell assembly taken along the line 2—2 of FIGURE 1.
FIGURE 3 is a sectional view of the photocell assembly taken along the line 3—3 of FIGURE 2.
Figure 4:
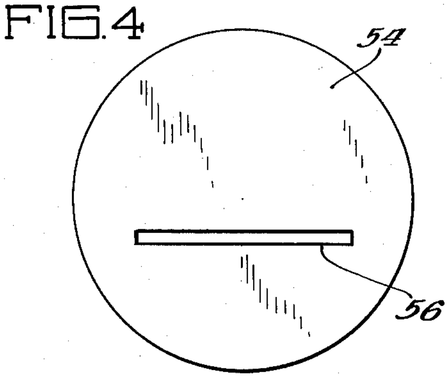
Figure 6:
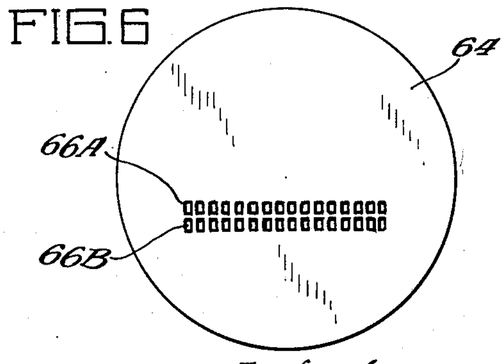

FIGURES 4, 5, and 6 are plan views of masks employed in the process of manufacturing the photocell assembly and illustrated in FIGURES 1 through 3;

FIGURE 7 is a modified form of the mask of FIGURE 4;

FIGURE 8 is a fragmentary sectional view taken along the line 8—8 of FIGURE 3; and FIGURE 9 is a fragmentary sectional view of a modified form of photocell taken along the same plane as FIGURE 8.

As illustrated in FIGURE 1, the optical encoder has a code disc 10 which is secured to a shaft 12 and rotatable therewith. A light source 14 confronts the code disc 10, and includes a lamp 16 with an elongated filament 18. A photocell assembly 20 is mounted on the side of the disc 10 opposite the light source 14, and includes a plurality of photocells 22 disposed with their sensitive areas parallel to a radius of the disc 10 and aligned with the light source 14. The filament 18 of the light source is normal to the axis of the sensitive areas of the photocells 22 to approach a point source. A semicylindrical lens 24 is mounted to a transparent plate 26 with its flat surface abutting the plate, and the lens is disposed between the photocells 22 and the disc 10. The semi-cylindrical lens 24 is aligned with the light source and the photocells, and focuses the light source on the sensitive areas of the photocells 22 in the manner disclosed in the patent application of William Mahaney entitled "Optical Encoder," Serial No. 627,456, filed December 10, 1956, now Patent No. 2,941,088, issued June 14, 1960.

The photocell assembly 20 employs a glass disc 28 and a plurality of Kovar pins 30 extend through the glass plate normal thereto and adjacent to the periphery thereof. The pins 30 are equally spaced from each other throughout an arc of approximately 240 degrees, and one pin 32 is disposed adjacent to the periphery of the disc approximately on the bisector of the subtended angle. A Kovar ring 34 is sealed about the periphery of the disc 28 and extends therefrom at an angle to the surface of the disc. A second glass disc 36 is sealed to the end of the ring 34 opposite the disc 28, thus forming an airtight cavity 38 between the parallel discs 28 and 36. A thin circular layer 40 of silver, or some other material forming a seal with the ring 34 is disposed between the disc 36 and the ring 34 to provide a suitable seal. The disc 36 is constructed of optically-ground, flat, transparent glass.

The pins 30 and 32 extend into the cavity 38 only a short distance to form electrical contact with the electrodes to be described hereinafter. The pins 30 and 32, however, extend a substantial distance on the side of the disc 28 opposite the cavity 38, to fit within apertures 42 of a printed circuit board 44, thereby making contact with an external electric circuit.

A thin strip 46 of photoconductive material is disposed within the cavity 38 on the surface of the disc 28 in a straight line, as indicated in FIGURE 3. The photoconductive material is a composition formed by any combination of a cation material from the class consisting of cadmium, lead, indium, mercury, gallium, zinc, and aluminum, with an anion material from the group consisting of sulphur, selenium tellurium, antimony, and arsenic. A plurality of pairs of electrodes, designated 48A and 48B, are disposed partially on the disc 28 and partially on the strip 46 of photoconductive material, and the electrodes 48A and 48B on the strip 46 being spaced from each other forming a gap. These electrodes 48A and 48B consist of films of electrically conducting material, such as Inconel, gold, or silver. Inconel is an alloy consisting of 80% Ni, 14% Cr, and 6% Fe.

The electrodes 48A are interconnected electrically and connected to the pin 32 by an electrically conducting strip 50 which overlaps the electrodes 48A and the pin 32. Also, each of the electrodes 48B is connected to one of the pins 30 by an electrically conducting strip or film 52 which overlaps one of the electrodes 48B and one of the pins 30.

In one particularly suitable construction, the photoconductive strip 46 consists of cadmium selenide, and the electrodes 48A and 48B are of Inconel. In this construction, the strips 50 and 52 are of gold. It is, of course, to be understood that the electrodes 48A and the strip 50 may be of a single material and deposited as a single element, and each of the electrodes 48B and each of the strips 52 may likewise be of a single material and deposited as a single element. In the particular construction described above, the photocell assembly contains sixteen photocells 22, and thus employs sixteen pins 30 and one pin 32.

In manufacturing the photocells according to the teachings of the present invention, the Kovar pins 30 and 32 are first sealed within the glass disc 28 and the Kovar ring 34 sealed about the periphery of the disc 28. It is to be understood that the pins 30 and 32 may be constructed of other electrically conducting materials and the disc 28 and ring 34 of other structural materials. Glass has been employed for the disc 28 because of its electrically insulating properties, and Kovar has been employed because of its thermal advantages when used with glass. A mask 54 having a thin straight slot 56 is then disposed in contact with the side of the disc 28 confronting the outwardly extending ring 34. The assembly of disc 28, pins 30 and 32, ring 34 and mask 54 are then placed in an evacuated chamber, and alternate layers of an anion material of the class described above and a cation material of the class described above are placed on the mask and disc 28 by vaporization within the evacuated chamber as disclosed in the application entitled "Semi-Conductive Films and Methods of Producing Them," referred to above. While a single layer of a cation material and a single layer of an anion material are satisfactory, it is generally desirable to provide a plurality of layers of each anion and cation material. As an alternative, the mask of FIGURE 7 may be employed to place discrete film spots on the glass substrate which are positioned to receive the electrodes 48A and 48B. Separate film spots tend to provide better isolation between cells. The mask of FIGURE 7, designated 54A, has a single row of equally spaced openings of equal width 56A in place of the single slot 56 of FIGURE 4.

Following deposition of the anion and cation material, the mask 54 is removed leaving a ribbon of alternate layers of anion and cation material on the glass disc. Therefore, the glass disc 28 and assembled elements are placed in a furnace or otherwise heated to produce a reaction between the anion and cation material. This reaction results in the formation of the strip 46 of photoconductive material. It is to be noted that temperatures of from 300 to 400 degrees centigrade are required to produce a reaction between the cation and anion materials of the groups specified, and that this temperature must be maintained for a period of time to complete the reaction. Since the glass disc 28 and the Kovar ring 34 have approximately the same temperature coefficients of expansion, this process of forming the photoconductive strip 46 does not injure the glass disc 28.

After the photoconductive strip 46 has been formed, the temperature of the assembly is reduced below 200 degrees centigrade, for example to room temperature, and the electrically conducting strips 50 and 52 are placed on the glass disc 28. This is accomplished by inserting a mask 58 having openings 60 and 62 in the shape of the strips 50 and 52, such as illustrated in FIGURE 5, adjacent to the glass disc 28, and evaporating the electrically conducting strips 50 and 52 thereon. The mask 58 completely covers and protects the photoconductive strip 46 during this process.

The electrodes 48A and 48B are then deposited on the surface of the strips 50 and 52, disc 28, and electrically conducting strip 46. It is necessary that the temperature of the film and assembly be maintained below 200 degrees centigrade at all times during the step of depositing the electrodes 48A and 48B and thereafter. The purpose for maintaining the temperature below this limit is that corrosion products tend to form at substantial rates between the film and the electrodes at temperatures above this limit. FIGURE 6 illustrates a mask 64 with a plurality of pairs of confronting openings 66A and 66B. The mask 64 is disposed in contact with the disc 28, photoconductive strip 46, and electrically conducting strips 50 and 52, and the electrode materials for the electrodes 48A and 48B are evaporated on the mask 64 and the exposed portions of the photocell assembly. It is to be understood that the electrodes 48A and 48B may be deposited prior to the strips 50 and 52, if so desired, and also that a single mask may be employed for depositing the strips 50, 52, and electrodes 48A and 48B. However, photocells requiring spacings of approximately 0.001 inch for use in optical encoders, require electrodes to be deposited in two steps as illustrated in order to provide masks of sufficiently narrow tolerances.

The photocell assembly is then completed by sealing the glass plate 36 to the Kovar ring 34. In order to accomplish this step, a silver ring 40 is disposed about the periphery of the glass plate 36, and the ring is fused by heating the Kovar ring 34.

In one particular construction, the photocell assembly has a photoconductive strip 46 of cadmium selenide, electrodes 48A and 48B of Inconel, and connecting strips 50 and 52 of gold. This combination of materials has proven to produce photocells with an improved response time over gold electrodes and other photoconductive materials. Also, photocells constructed in this manner have their maximum sensitivity to light of approximately 6400 angstroms which is readily produced by a light source. In the manufacturing of cadmium selenide cells, two layers of cadmium and two layers of selenium are deposited on the disc 28, and then heated at a temperature of from 300 to 400 degrees centigrade for a period of approximately one hour. The temperature of the assembly is then reduced to approximately room temperature before depositing the electrodes. At all times thereafter in the manufacturing process, the temperature of the assembly is maintained near room temperature, i.e. below 100 degrees centigrade.

It is clear from the foregoing disclosure that the photocell assembly is maintained at a relatively low temperature throughout all steps following the reaction between the anion and cation materials which form the photoconductive strip 46. As a result, a lower resistance contact is assured between the photoconductive strip 46 and the electrodes 48A and 48B. Further, it is also clear that only the glass disc 36 requires optical properties. Hence, the disc 28 may be selected of materials suitable to withstand the temperate ranges required in the manufacturing of photocell assemblies and materials which are readily sealed about the pins 30 and 32.

It is also possible to construct photocells with photoconductive films of the type described with the electrodes directly abutting the substrate and the photoconductive film overlying the electrodes, and such photocells when properly constructed will exhibit electrical characteristics comparable to the photocell assembly illustrated in FIGURES 1 through 3 and 8. FIGURE 9 illustrates such a photocell assembly as a modification of the photocell assembly illustrated in FIGURES 1 through 3 and 8. Electrodes 70A and 70B are directly disposed on the glass disc 28, and a mass 72 of photoconductive material identical to that of the strip 46 is disposed between the electrodes 70A and 70B.

Because of the fact that the photoconductive layer or strip 72 requires relatively high temperatures when being formed, it is necessary to restrict the materials for the electrically conducting electrodes 70A and 70B. Rhodium has been found to be the most desirable electrode material to date, and only two other materials have been found to be satisfactory. These materials are Inconel and electrically conducting glass, namely $SnO_2$ glass often referred to as Nesa glass. The photoconductive layer 72 may be formed of any of the materials described above for the strip 46, and is formed in an identical manner.

It is also necessary when fabricating photocells where the electrodes are disposed on the side of the photoconductive material opposite the direction of the light to limit the thickness of the layer of photoconductive material disposed on the confronting electrodes. If the photoconductive layer 72 is no more than one hundred molecules in depth, the effective spacing between the ends of the electrodes 70A and 70B approximates the actual spacing. However, if the photoconductive layer is deposited on the ends of the electrodes to a depth in excess of one hundred molecules, the effective spacing between the electrodes will be greater than the actual spacing.

Inconel electrodes may be deposited on the glass disc substrate in any of the conventional manners, such as employing one of the masks of FIGURES 5 and 6, and evaporating a layer of Inconel onto the glass substrate. It is generally necessary to scribe or etch electrically electrically conducting glass from the glass disc 28 in order to form the electrically conducting electrodes 70A and 70B, although other means are also available to place the electrically conducting glass electrodes on the glass substrate. Rhodium electrodes may be etched upon the glass substrate in the manner disclosed in the application of the inventors entitled "Methods of Etching Metals in the Platinum Group and Producing Printed Circuits Therefrom," filed April 5, 1957, Serial No. 651,009, now Patent No. 3,013,956.

Those skilled in the art will devise applications and modifications of the photocells and assemblies and methods of making them as a result of the foregoing disclosure. It is therefore intended that the scope of the present invention be not limited by the foregoing disclosure, but rather only by the appended claims.

The invention claimed is:

1. The method of producing a photocell assembly having a plurality of photocells disposed on an axis comprising the steps of mounting a plurality of pins in a plurality of bores disposed adjacent to the perimeter of a flat glass plate-shaped base of electrically insulating material with the pins extending parallel to each other from one surface of the base and being exposed on the other surface of the base, thereafter positioning a first mask having a slot defining the axis of the photocells on the said other surface of the base, thereafter depositing alternate layers of a cation material chosen from the class consisting of cadmium, lead, indium, mercury, gallium, zinc and aluminum, and an anion material chosen from the group consisting of sulphur, selenium, tellurium, antimony, and arsenic, on the surface of the mask and exposed base, thereafter removing the first mask and heating the base and deposited layers to a temperature between 300° and 400° centigrade to produce a reaction between the anion and cation to form a semiconductive film, said temperature being below the melting point of the glass base, thereafter cooling the base and film to a temperature below 200 degrees centigrade, thereafter positioning a second mask having a plurality of pairs of apertures on the base, the apertures of each pair being on opposite sides of an axis and the axis of the second mask being positioned over the axis of the semiconductive film and each aperture of each pair confronting a portion of the semiconductive film, vapor depositing an electrically conducting layer on the second mask and exposed surface of the film to form a plurality of pairs of electrodes on the surface of the semiconductive film and electrically interconnecting the electrodes and the pins.

2. The method of producing a photocell assembly having a plurality of photocells disposed on an axis comprising the steps of claim 1 wherein the step of electrically interconnecting the electrodes and the pins includes positioning a third mask on the surface of the base, semiconductive film and electrodes, the third mask having a plurality of slots, each slot confronting a portion of an electrode and the exposed end of one of the pins, and evaporating an electrically conducting layer on the third mask, and exposed portions of the base, electrodes and pins.

3. The method of producing a photocell assembly comprising the steps of claim 2 wherein the electrically conducting material evaporated on the second mask is of the material of the class consisting of $SnO_2$ glass, rhodium, and a composition of nickel, chromium and iron.

4. The method of producing a photocell assembly comprising the steps of claim 3 wherein the material evaporated on the third mask consists of gold.

5. The method of producing a photocell assembly having a plurality of photocells comprising the steps of mounting a plurality of electrically conducting pins on a base of electrically insulating material having two opposite surfaces and a melting point above 400° centigrade, the pins extending outwardly from one surface and protruding from the other surface, positioning a first mask having an opening therein in abutment with said other surface of the base, thereafter depositing alternate layers of a cation material chosen from the class consisting of cadmium, lead, indium, mercury, gallium, zinc, and aluminum, and an anion material chosen from the group consisting of sulphur, selenium, tellurium, antimony, and arsenic, on the surface of the mask and exposed base, thereafter removing the first mask and heating the base and deposited layers to a temperature between 300 and 400° centigrade to produce a reaction between the anion and cation to form a semiconductive film, thereafter cooling the base and film to a temperature below 200° centigrade, thereafter positioning a second mask having a plurality of pairs of apertures on the base, each of said pairs of apertures and the portion of said second mask between the apertures of each pair confronting a continuous portion of the film and the adjacent edges of the apertures of each pair being disposed on straight parallel axes, vapor depositing an electrically conducting layer on the second mask and exposed surface of the film to form a plurality of pairs of electrodes on the surface of the semiconductive film, removing the second mask from the surface of the base, positioning a third mask in abutment with the other surface of the base, film, and electrodes, said third mask having a plurality of slots, each slot extending between and overlapping one electrode of each pair and the exposed surface of one of the pins, and depositing a layer of electrically conducting material on the third mask, and exposed portions of the base, and electrodes.

6. The method of producing a photocell comprising the steps of claim 5, wherein the first mask is provided with a separate opening for each photocell and a plurality of layers of cation and anion material are deposited on each area of the base exposed through the openings of said first mask, and the second mask is positioned in abutment with said other surface of the base with one pair of apertures confronting each layer of photoconductive film.

7. The method of producing a photocell assembly comprising the elements of claim 4, wherein the base of electrically insulating material is provided with a flange extending outwardly about the perimeter of said other surface in combination with the step of sealing a transparent plate to the flange confronting said other surface.

8. The method of producing a photocell assembly comprising the elements of claim 1 in combination with the steps of mounting a Kovar ring about the perimeter of the base and sealing said ring thereto, said ring extending outwardly from the other surface of said base, and sealing a transparent flat plate to the portion of the ring remote from the base, thereby permitting illumination of the photocell assembly through the transparent plate and sealing the photocell assembly from the ambient atmosphere.

References Cited by the Examiner

UNITED STATES PATENTS

| | | | |
|---|---|---|---|
| 2,367,816 | 1/45 | Wyss | 313—94 |
| 2,634,322 | 4/53 | Law | 117—200 X |
| 2,670,523 | 3/54 | Orthuber | 29—25.17 |
| 2,745,047 | 5/56 | Lighty | 117—200 |
| 2,749,598 | 6/56 | Orthuber | 29—25.17 |
| 2,759,861 | 8/56 | Collins et al. | 148—1.5 |
| 2,763,581 | 9/56 | Freedman | 148—1.5 |
| 2,765,385 | 10/56 | Thomsen | 117—212 |
| 2,793,275 | 5/57 | Breckenridge et al. | 338—15 |
| 2,809,132 | 10/57 | Bloem | 117—200 |
| 2,813,991 | 11/57 | Taft | 313—94 |
| 2,865,793 | 12/58 | De Nobel | 117—200 |
| 2,892,250 | 6/59 | Bartels | 29—155.63 |
| 2,908,594 | 10/59 | Briggs | 117—201 |
| 2,916,810 | 12/59 | Smith et al. | 117—200 X |

OTHER REFERENCES

Physical Review, vol 92, No. 6, December 1953, pages 1573–1575.

Electronic Engineering, Oct. 1, 1946, pages 316, 317 and 322.

JOHN F. CAMPBELL, *Primary Examiner.*

WHITMORE A. WILTZ, *Examiner.*